United States Patent [19]

Schultz

[11] 4,053,903

[45] Oct. 11, 1977

[54] SCANNING RATE AND INTENSITY CONTROL FOR OPTICAL SCANNING APPARATUS

[75] Inventor: Thomas W. Schultz, Seneca Falls, N.Y.

[73] Assignee: GTE Sylvania Incorporated, Stamford, Conn.

[21] Appl. No.: 699,047

[22] Filed: June 23, 1976

[51] Int. Cl.$^2$ .............................................. G03B 41/00

[52] U.S. Cl. ........................................................ 354/1

[58] Field of Search ........................ 354/1, 4, 5; 350/6, 350/7, 285; 355/8, 20, 84; 96/36.1; 427/43, 53, 54, 68

[56] References Cited

U.S. PATENT DOCUMENTS

| | | | |
|---|---|---|---|
| 3,506,779 | 4/1970 | Brown et al. | 350/6 UX |
| 3,760,698 | 9/1973 | Fujimura | 354/1 |
| 3,876,425 | 4/1975 | Geenen et al. | 354/1 X |

*Primary Examiner*—John Gonzales

*Attorney, Agent, or Firm*—Norman J. O'Malley; Thomas H. Buffton; Robert T. Orner

[57] ABSTRACT

In an optical scanning exposure system for manufacturing cathode ray tubes having a faceplate with an inner surface layer of photosensitive material and an adjacent apertured mask wherein the exposure system includes a light source providing a light beam, an angle of incidence deflector means for deflecting the light beam at an angle related to the angle of incidence of an electron beam, means for imaging the light beam, and a means for scanning the light beam in a predetermined fashion over the apertured mask to expose the photosensitive material, a control system having a means for storing information representative of the angle of incidence of a light beam and the rate of scanning of a light beam between a matrix of positional locations on the faceplate, a scan rate means for controlling the rate of horizontal and vertical light beam scanning, an encoder means providing light beam positional information to the storage means, and an angle of incidence control means for activating the angle of incidence deflector means in accordance with angular information of the storage means.

Other aspects of the invention include controlling the integral with respect to time of the light beam intensity to effect uniform photosensitive material exposure, controlling movement of the effective light beam source to control the size and shape of the exposure area, and controlling the overlapping and overscanning of the light beam scanning to minimize stripes of unexposed photosensitive material and to provide uniform exposure at the edges of the faceplate.

6 Claims, 4 Drawing Figures

FIG. I

SCANNING RATE AND INTENSITY CONTROL FOR OPTICAL SCANNING APPARATUS

CROSS REFERENCE TO OTHER APPLICATIONS

A concurrently filed application entitled "Optical Scanning Apparatus for Photolithography of a Color Cathode Ray Tube Having An Aperture Mask" bears U.S. Ser. No. 699,109 and is filed in the name of John Schlafer. Therein, a method and apparatus for fabricating a cathode ray tube by an optical scanning technique is provided and fully detailed.

Also, concurrently filed applications directed to Optical Scanning Apparatus include: "Overlap and Overscan Exposure Control System" bearing U.S. Ser. No. 699,054 filed in the name of Mahlon B. Fisher and G. Norman Williams; "Exposure Area Control For An Optical Scanning System of Manufacturing Cathode Ray Tubes" bearing U.S. Ser. No. 699,046 in the name of Thomas W. Schultz; "Control System For An Optical Scanning Exposure System For Manufacturing Cathode Ray Tubes" bearing U.S. Ser. No. 699,045 filed in the name of Thomas W. Schultz; and "Optical Scanning Apparatus and Method For Manufacturing Cathode Ray Tubes" filed in the names of G. Norman Williams, Robert F. Wilson, and John Schlafer bearing U.S. Ser. No. 699,110.

BACKGROUND OF THE INVENTION

The present invention relates to a system for controlling an optical scanning exposure system suitable to the manufacture of cathode ray tubes and more particularly to a control system for storing information representative of the angle of incidence of a light beam at a matrix of points and scan rate information intermediate the points of the matrix and for applying the stored information to an optical scanning system to effect a proper rate and angle of scanning and deflection of a light beam which is imaged on a layer of photosensitive material affixed to the faceplate of a cathode ray tube.

At present, the most common technique of manufacturing cathode ray tubes and particularly color cathode ray tubes is a stationary or non-scanning technique. In this process, a layer of photosensitive material is affixed to the inner surface of the faceplate of the cathode ray tube, dusted with phosphor, and exposed at desired locations by a flood of light passing through the apertures of an adjacent apertured mask. The unexposed photosensitive material is then removed by well-known washing techniques while the exposed material is affixed to the faceplate.

As to control of the above-described exposure apparatus, the light source is usually an ultraviolet source whose output is directed through a small aperture and then dispersed to flood the entire apertured mask associated with the faceplate of the cathode ray tube. The intensity of the light appearing at the apertured mask, which is not necessarily uniform throughout the mask, is varied by varying the intensity of the source and by the use of a neutral density filter intermediate the light source and the apertured mask.

Additionally, it is well known that an electron beam in a cathode ray tube does not follow a straight-line trajectory due to the distributed magnetic fields associated with the operation of the cathode ray tube. In contrast, light beams do follow straight-line trajectories. To compensate for this discrepancy, a special contoured lens is normally disposed between the light source and the apertured mask. The lens is designed such that the light source appears to come from the correct location to cause the light rays to pass through the apertures of the mask at the same angle of incidence as would an electron beam in a cathode ray tube. Thus, the light beam passes through each aperture of the mask at an angle related to the angle of incidence of an electron beam passing through the same aperture.

Although widely used in fabricating cathode ray tubes, the above-mentioned technique is far from an ideal manufacturing process. Specifically, designing and fabricating the contoured lens is a costly and time-consuming procedure. The design of the lens is usually effected by a trial and error process which normally requires numerous repetitive attempts before a satisfactory result is obtained. Also, the neutral density filter is similarly designed requiring exhaustive trial and error attempts. Moreover, a lens and filter is required for each of the guns of a particular design and must be altered for changes in design of the guns, screens, curvature of the mask and numerous other parameters of the cathode ray tube structure.

Another known technique for manufacturing cathode ray tubes is what might be called a "scanning system" wherein a light beam from a light source is scanned across an apertured mask adjacent a layer of photosensitive material affixed to the faceplate of a cathode ray tube. The light passing through the apertures of the mask exposes the photosensitive material. This exposed photosensitive material remains affixed to the faceplate and the unexposed material is removed by washing in a well known manner.

Although the above-mentioned broadly described exposure technique is suggested in a British patent specification No. 1,257,933 and in a U.S. Patent issued to Grenen et al. bearing U.S. Pat. No. 3,876,425, any reference to apparatus for controlling the above described exposure process is conspicuously absent. Specifically, each of the above patents is directed to the method of making a cathode ray tube by a scanning exposure technique rather than to a system for controlling an exposure or scanning process.

OBJECTS AND SUMMARY OF THE INVENTION

An object of the present invention is to enhance the manufacture of cathode ray tubes by an optical scanning exposure system. Another object of the invention is to provide a system for controlling an optical scanning exposure system suitable to the fabrication of cathode ray tubes. A further object of the invention is to provide a control system having a memory and a scan rate and angle of incidence control means responsive to the memory for controlling light beam varying apparatus. A still further object of the invention is to control the integral with respect to time of the light beam intensity during scanning of the faceplate. Other objects include control of the size and shape of the area of the exposure and control of the scan overlap and overscan of the faceplate of the light beam.

These and other objects, advantages and capabilities are achieved in one aspect of the invention by a control system for an optical scanning exposure system having a light beam scanning a layer of photosensitive material on the faceplate of a cathode ray tube wherein the control system includes an encoder providing light beam positional information to a memory which, in turn, provides angular information related to an angle of incidence of an electron beam to a means for inducing the same angle of incidence in a light beam and providing information representative of the rate of scan of the light beam to a scan rate means to control the horizontal and vertical scan rate of the light source.

In other aspects of the invention, means are provided for controlling the integral with respect to time of the light beam intensity at positional locations on the faceplate. Also, the size and shape of the exposure area is controlled by adding a signal from a signal source while additional control for overlap and overscan of the light beam on the faceplate is provided.

DESCRIPTION OF THE PREFERRED EMBODIMENT

For a better understanding of the present invention, together with other and further objects, advantages and capabilities thereof, reference is made to the following disclosure and appended claims in conjunction with the accompanying drawings.

Figure 1:
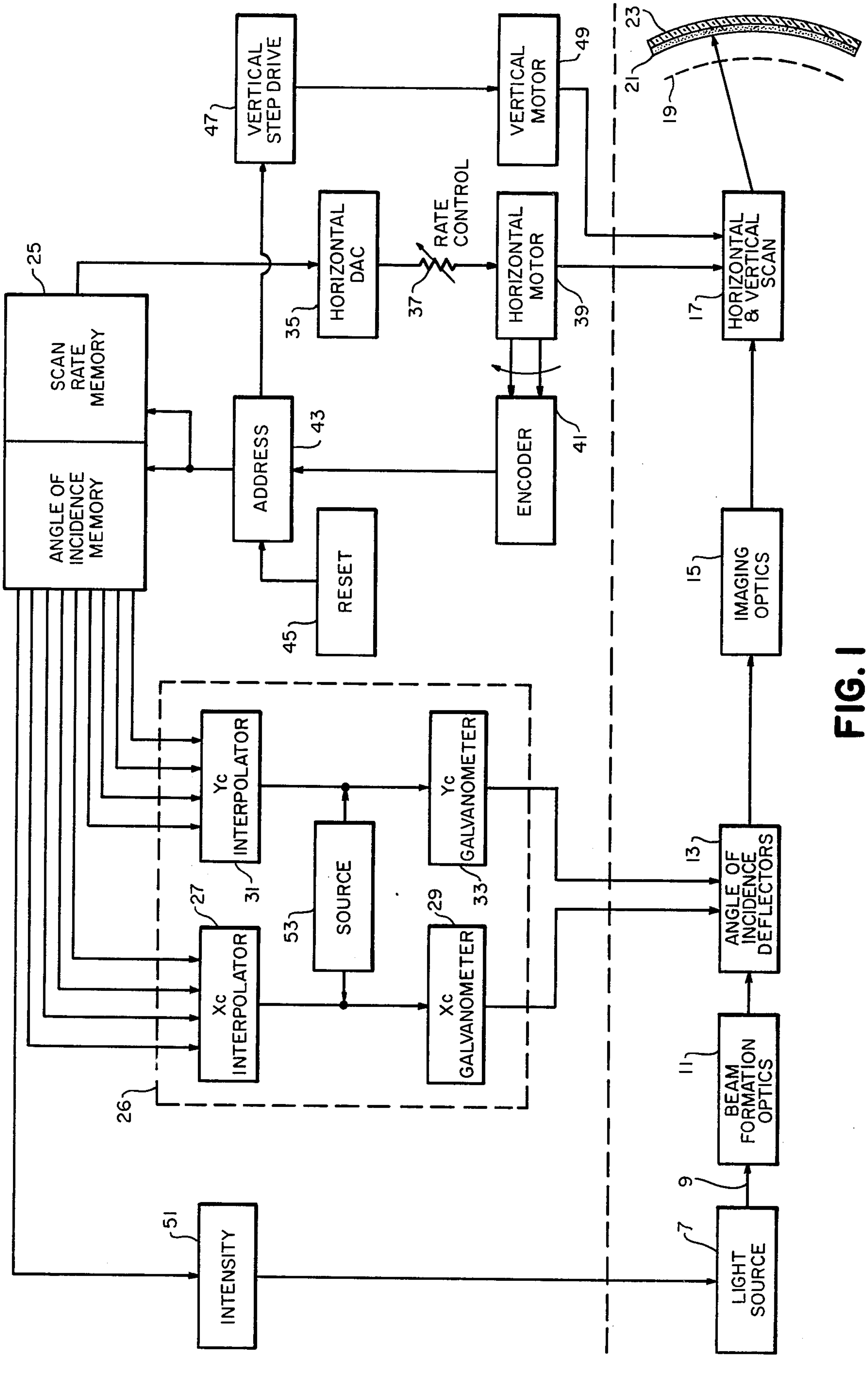
FIG. 1 is a block diagram illustrating a control system for an optical scanning exposure system suitable to the manufacture of cathode ray tubes.

Referring to the drawings, FIG. 1 is a block diagram illustration of a system for controlling an optical scanning exposure system suitable to the manufacture of cathode ray tubes. As detailed in the cross referenced application, an optical scanning exposure system includes a light source 7, preferably a laser, which directs a light beam 9 onto a beam forming optics configuration 11. The formed light beam is applied to an angle of incidence deflector means 13 which alters the path of the light beam in a manner affecting its angle of arrival at the CRT faceplate but does not seriously alter the position at which it strikes the faceplate.

This angular altered light beam is applied to an imaging optic system 15 wherein the light beam is correctly imaged and applied to a horizontal and vertical scanning means 17. The horizontal and vertical scanning means 17 is directed in a predetermined horizontal and vertical scanning path and causes the light beam to scan an apertured mask 19 adjacent a layer of photosensitive material 21 affixed to the inner surface of the faceplate 23 of a cathode ray tube.

As to a control system for the above-described optical scanning exposure system, the control system includes an angle of incidence and scan rate storage means 25, to be further explained hereinafter, wherein is stored information representative of an angle related to the angle of incidence of an electron beam for a given positional location on the faceplate 23 of the cathode ray tube. Also, the angle of incidence and scan rate means 25 stores information representative of a desired rate of light beam movement between positional locations on the faceplate 23 of the cathode ray tube. Moreover, numerous forms of storage or memory systems are commercially available such as the "L-series Development System" of Control Logic Inc., Nine Tech Circle, Natick, Mass., for example.

The information from the angle of incidence and scan rate storage means 25 is applied to an angle of incidence control means 26. This angle of incidence control means 26 includes a series connected X*c* interpolator 27 and X*c* galvanometer 29 for horizontal angle correction and a series connected Y*c* interpolator 31 and Y*c* galvanometer 33 for vertical angle correction. The X*c* and Y*c* interpolators, 27 and 31 respectively, are coupled to the angle of incidence storage means 25 while the X*c* and Y*c* galvanometers, 29 and 33, are coupled to the angle of incidence deflector means 13.

Also, the information from the angle of incidence and scan rate storage means 25 is applied to a scan rate means which includes a horizontal digital to analog converter 35, an alterable rate control means 37, and a horizontal scanning motor 39 series coupling the storage means 25 to the horizontal and vertical scanner means 17 of the optical scanning exposure system. The horizontal scanning motor 39 is also coupled to a position encoder 41 whereby information representative of the positional location of the light beam on the faceplate 23 of the cathode ray tube is applied to a memory address system 43 coupled to the angle of incidence and scan rate storage means 25.

The memory address system 43, such as any one of a number of TTL logic circuits readily available in the market, has a reset means 45 coupled thereto for restoring the storage means 25 to an initial starting position. Also, a vertical stepping driver stage 47 couples the memory address system 43 to a vertical scanning motor means 49 coupled to the horizontal and vertical scanning means 17 of the optical scanning exposure system.

Additionally, an intensity control circuit means 51 may be provided for coupling the angle of incidence and scan rate storage means 25 to the light source 7 of the optical scanning exposure system. Also, an AC potential source 53 may be coupled to the X*c* interpolator 27 and Y*c* interpolator 31 of the scan position means to effect combining of a signal therewith to provide a desired variation in the angle of incidence deflector means 13 as will be further explained hereinafter.

Figure 2:
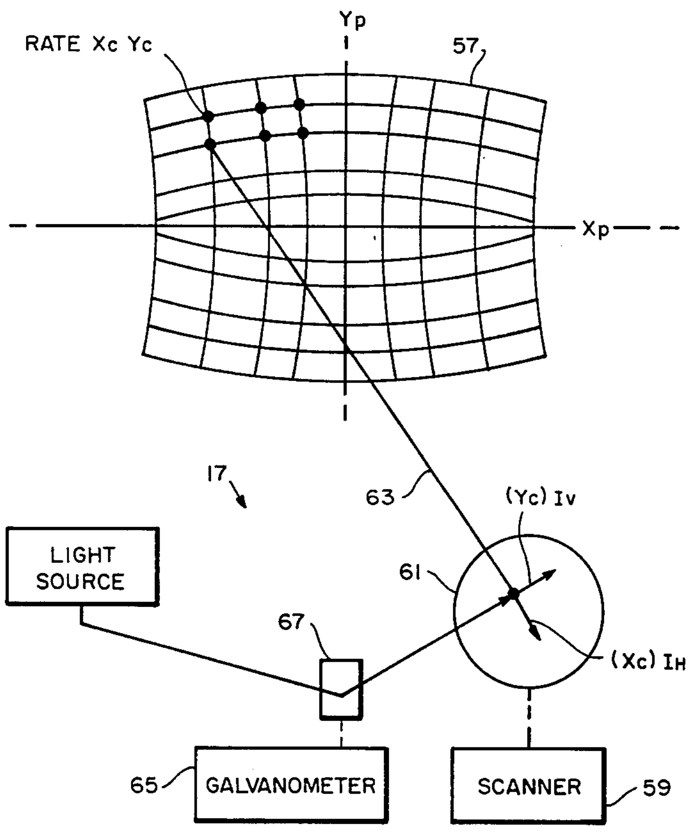
FIG. 2 is a symbolic illustration to assist in the explanation of the control system of FIG. 1.

Referring to FIG. 2 and the information stored by the angle of incidence and scan rate storage means 25, a matrix of points is selected wherein the points are at equal angular increments of a light beam scanning the faceplate of a cathode ray tube. Because of the nature of the scanning apparatus and the selected equal angular increments of scan, there is provided a resultant raster configuration 57 of FIG. 2.

In order to establish a proper angle of incidence for a light beam representative of the angle of incidence for an electron beam at the particular location on the faceplate of the cathode ray tube, an empirical process may be utilized. For example, the prior art lens and neutral density filter technique may be utilized to expose a matrix of points on a faceplate. This faceplate is then mounted in the optical scanning exposure system. Thereupon, the light beam is scanned to a particular positional location and the angle of incidence deflector means 13 is altered to provide an angle representative of the proper angle of incidence of an electron beam at the particular positional location on the faceplate of the cathode ray tube. This angle representative of the proper angle of incidence is translated into the current values representative of the proper amount of drive for application to the angle of incidence deflector means 13. This proper amount of drive for a given scanning location is stored in the angle of incidence and scan rate storage means 25.

Also, a signal representative of the desired rate of scan of the light from one positional location to the next adjacent positional location on the matrix of points of the faceplate is stored in the angle of incidence and scan rate storage means 25. Thus, each of the matrix of points on the faceplate of the cathode ray tube provides information for effecting the proper angular correction of the light beam in both horizontal and vertical planes and the proper rate of scan movement of the light beam from one position to another.

It may also be noted that a horizontal and vertical scanning means 17 of FIG. 1 includes scanning motor means 59 of FIG. 2 for altering a scanning mirror means 61 to cause a light beam 63 to scan a faceplate in a pattern represented by the raster configuration 57. Thus, the light beam 63 is directed in a predetermined manner to the matrix of points on the faceplate of the cathode ray tube.

As the light beam impinges on a point on the faceplate of the cathode ray tube, signals are retrieved from the memory storage means 25 to cause the horizontal and vertical galvanometers 65 of the angle of incidence deflector means 13 to position the mirrors 67 such that a light beam 63 is properly applied to the scanning mirror means 61. The deflected light beam arrives at the scanning mirror means 61 in the proper positional location to be directed to the faceplate at an angle related to the angle of incidence of an electron beam in a cathode ray tube arriving at the same positional location. In other words, the light beam impinges on the photosensitive material at the same place on the faceplate and at an angle related to the angle an electron beam would have arriving at the same positioned location in a cathode ray tube.

As to the operation of the control system of FIG. 1, activating the reset means 45 causes the memory address system 43 to energize the angle of incidence and scan rate storage means 25 and retrieve information at a first positional location of the matrix of points on the faceplate of the cathode ray tube. The memory address system 43 also activates the vertical stepping driver 47 which, in turn, causes the vertical motor means 49 to activate the horizontal and vertical scan means 17 to direct the light beam to vertically scan the faceplate of the cathode ray tube.

The angle of incidence and scan rate storage means 25 provides information signals to the horizontal digital to analog converter 35 which controls the horizontal scan motor 39 and causes the horizontal and vertical scanning means 17 to scan the light beam along a substantially horizontal path across the faceplate 23. The horizontal scan motor 39 also activates the position encoder 41 in accordance with the scanning location of the light beam on the faceplate 23. In turn, the position encoder 41 activates the address system 43 to cause the scan rate memory storage means 25 to provide signals representative of the desired rate of horizontal scan to the horizontal scan motor 39.

An alterable rate control means 37, preferably in the form of an adjustable resistor may be employed to control or provide adjustment of the rate of horizontal scan throughout the total horizontal scan period. In other words, the single alterable control means 37 may be utilized to effect the same percentage of alteration in the rate of scan across all of the matrix of points on the faceplate of the cathode ray tube. Thus, one simple adjustment of the alterable rate control means 37 permits a uniform percentage of scan rate alteration between each of the matrix of points on the faceplate of the cathode ray tube.

Further, it can readily be understood that the memory address system 43 and vertical motor means 49 may be programmed to vary the magnitude of vertical movement of the light beam such that overlapping of adjacent horizontal scan lines is effected. It has been found that a light beam overlap of adjacent horizontal scan lines of at least 50% and preferably about 70% of the width of the light beam minimizes the appearances of stripes of unexposed photosensitive material on the faceplate 23.

It can be further understood that the horizontal scanning motor 39 may be directed or addressed in a manner to cause the horizontal scan lines to continue beyond the ends of the faceplate 23. Thus, it has been found that a horizontal overscan of the faceplate 23 by about 5% of the length of horizontal scan insures a uniform exposure of the photosensitive material near the ends of the horizontal scan lines. Moreover, vertical overscan of the faceplate 23 may also be effected by having the memory address system 43 alter the operation of the vertical scan motor 49.

Returning to the angle of incidence and scan rate storage means 25, it has previously been set forth that at each of the matrix points on the faceplate 23 information has been obtained representative of an angle related to the angle of incidence of an electron beam directed to the same positional location on the faceplate. Thus, as the positional location whereat the light beam is directed is altered in accordance with the scanning of the light beam in a predetermined pattern, the position encoder 41 and address system 43 provide the information to the angle of incidence and scan rate storage means 25 to select the proper angle of incidence for the given position on the faceplate.

As a result, information regarding the angle related to the angle of incidence of an electron beam for the newly selected positional location is applied to that portion of the angle of incidence control means 26 illustrated as the X*c* interpolator 27 and Y*c* interpolator 31. The X*c* interpolator 27 and Y*c* interpolator 31 energize the X*c* galvanometer 29 and the Y*c* galvanometer 33 to control the angle of incidence deflector means 13 in a manner such that the impinging light beam is properly deflected. Thus, the light beam is deflected in a manner such that it arrives at the horizontal and vertical scanning means 17 in the proper location to be directed to the previously indicated point of the matrix on the faceplate 23 at an angle related to the angle of incidence an electron beam would have arriving at the same point of the matrix.

In other words, the horizontal and vertical scanning means 17 causes the light beam to be directed to the matrix of points on the faceplate 23 in a predetermined scanning raster. The angle of incidence deflector means 13 in response to the angle of incidence control means 26 acting on information from the memory storage means 25 causes the light beam to appear at the surface of the scanning mirror, 61 of FIG. 2, in the proper manner to be directed to the faceplate 23 at an angle representative of the angle of incidence of an electron beam striking the faceplate 23 at the same positional location. Also, the memory storage means 25 provides the proper information to the horizontal scan motor 39 in response to the given positional location of the scanning of the faceplate 23 by the light beam to cause the light beam scanning to proceed at a proper preselected rate of scan to the next adjacent point of the matrix on the faceplate 23.

Further, the Xc interpolator 27 and the Yc interpolator 31 of FIG. 1 are preferably linear interpolators for providing interpolated angular information to the angle of incidence deflector means 13 as the light beam is advanced from one point of the matrix of points on the raster developed by the horizontal and vertical scanning means 17. Thus, the light beam not only arrives at each of the matrix of points on the faceplate 23 at the correct angle of incidence but also arrives at the faceplate at the correct angle of incidence for a plurality of positional locations intermediate to the points of the matrix.

Figure 3:
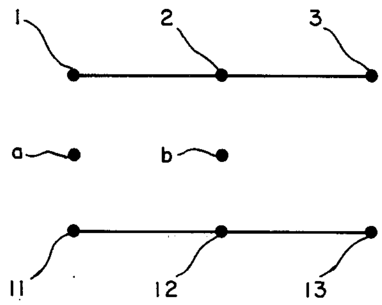
FIG. 3 is an explanatory diagram for explaning one form of interpolator apparatus of FIG. 1.
Figure 4:
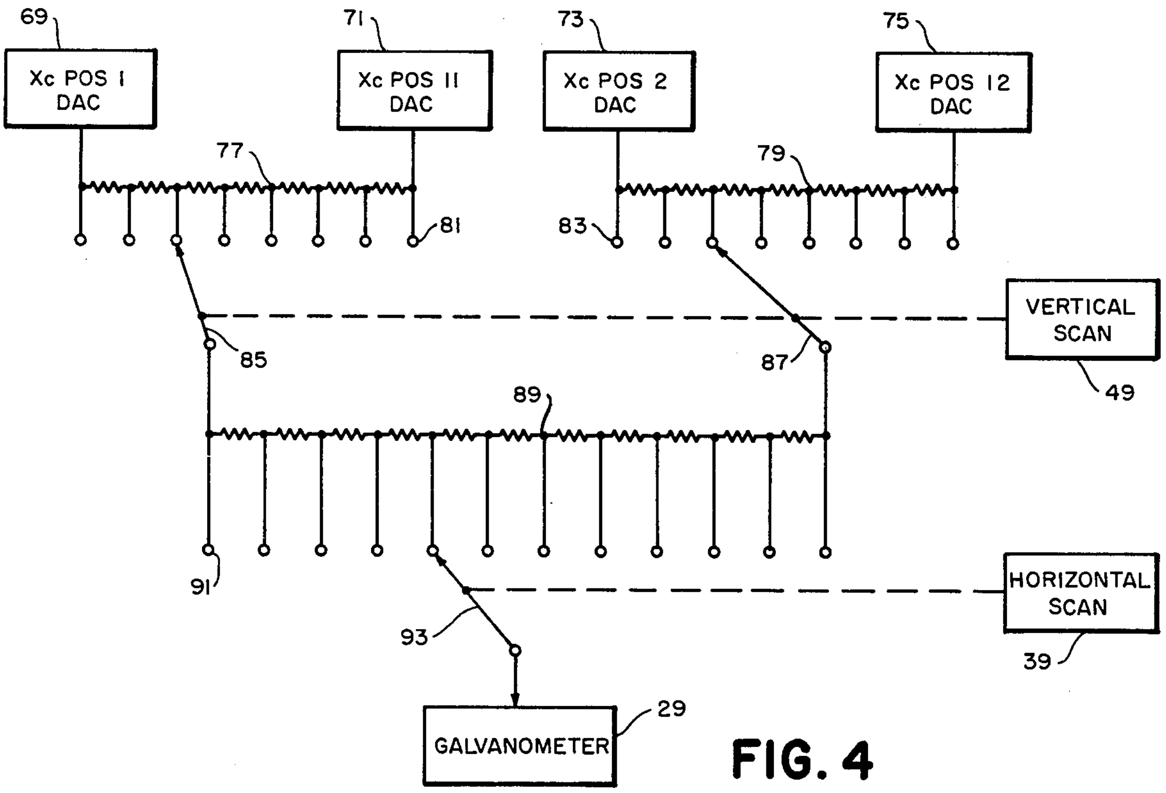
FIG. 4 is a form of interpolator apparatus suitable to the system of FIG. 1.

More specifically, FIGS. 3 and 4 will serve to illustrate one form of interpolator for providing linear data intermediate to points of a matrix. Let it be assumed that FIG. 3 represents a matrix of points on the faceplate of a cathode ray tube with one horizontal row of points numbered 1, 2, and 3 and the following horizontal row of points numbered 11, 12, and 13 respectively.

Referring only to the Xc interpolator 27, it may be assumed that the Xc interpolator 27 includes a plurality of terminals, 69, 71, 73, and 75, each including a digital to analog converter, for receiving signals from the angle of incidence and scan rate storage means 25 representative of the matrix points 1, 11, 2, and 12 respectively. A plurality of substantially identical resistors 77 are series connected intermediate the terminals 69 and 71. Similarly, a plurality of substantially indentical resistors 79 are series connected intermediate the terminals 73 and 75. Contact members 81 and 83 extend from the series connected resistors 77 and 79 and adjustable ganged switch members 85 and 87 are coupled to the vertical scan motor means 49. A plurality of series connected resistors 89 with extending contact members 91 are series connected intermediate the ganged switch members 85 and 87 with an adjustable contact arm 93 coupling the contact members 91 to the Xc galvanometer 29 and mechanically coupled to the horizontal scan motor means 39.

As to operation, it can readily be seen that the vertical scan motor means 49 will alter the adjustable ganged switch members 85 and 87 as the light beam is vertically advanced or as vertical scanning of the raster proceeds. Thus, the information supplied to the Xc galvanometer 29 may be represented by the points "*a*" and "*b*" of FIG. 3. At the same time, the horizontal scan motor means 39 is rapidly altering the adjustable contact arm 93 to provide a signal representative of some positional location intermediate the points "*a*" and "*b*". As a result, the Xc galvanometer alters the point at which the light beam strikes the surface of the scanning mirror, 61 of FIG. 2, in a direction and for a distance which proceeds as indicated by the arrow $I_h$ of FIG. 2.

Further, it can readily be understood that the Yc interpolator 31 would include the features and operate in a manner substantially identical to the above-described operation of the Xc interpolator 29. Thus, the point at which the light beam would strike the surface of the scanning mirror, 61 of FIG. 2, would be advanced in a direction and for a distance which would proceed as indicated by the arrow $L_v$ of FIG. 2. Moreover, the summation of the above information would provide the positional location and direction of advancement of the light beam impingement of the sufrace of the scanning mirror 61.

Additionally, it may be, but not necessarily need be, desirable to alter the light beam which impinges the faceplate 23 in order to vary the exposure of the photosensitive material 21 by way of the apertures of the apertured mask 19. A preferred way of obtaining the above-mentioned alterations in light beam impingement is to provide a signal source 53 for combination with the signals from the Xc interpolator 27 and Yc interpolator 31 to the Xc and Yc galvanometer 29 and 33 respectively. The signal from the signal source 53 may be of a triangular-shaped waveform and preferably is a sinusoidal AC signal, such as provided by an oscillator for example, having a frequency in the range of about 1 to 10 KHz.

The signal may be combined in a manner to provide alteration of one or all of the galvanometers driving the mirrors of the angle of incidence deflector means 13. Also, the phase and amplitude of the applied signal may be varied to alter the configuration of the movement such that the light beam will have a circular motion, in-phase motion in one or both directions to provide a line, or any one of a number of motions of a desired configuration.

Utilizing the above technique it can readily be seen that the size of the exposure area is readily controlled due to control of the partial and fully exposed areas. Moreover, this so-called "wobble" technique of altering the positional location of the impinging light beam permits control of the size of the developed area of the photosensitive material.

In another aspect, the intensity control circuit means 51 may be utilized to vary the intensity of the light source 7 in accordance with preselected information from the memory storage means 25. Alternately, the rate of scan of the light beam is controllable in accordance with information stored in the memory storage means 25. Further, the rate control 37 may be adjusted to control the overall scan period of the faceplate. Therefore, the integral with respect to time of the light beam exposure of the photosensitive material 21 on the faceplate of the cathode ray tube is readily controlled. Moreover, it has been found that horizontal scanning of the light beam at an angular velocity greater at the center of scan than at the ends of scan improves the uniformity of exposure of the photosensitive material.

Thus, there has been provided a unique control system for use with an optical scanning system suitable to the manufacture of cathode ray tubes. The control system is flexible in that adjustments for changes in tube types or electron guns of the same tube type are readily made by altering the information in a memory system. Also, the system allows control at a multitude of points on the faceplate of the cathode ray tube and this matrix of points is readily extendable without the constraints ordinarily associated with lens systems and lens configurations.

Additionally, the system includes the added capability of controlling the rate of scan across intermediate points of the matrix on the cathode ray tube, the rate of the overall scan with a single and simple adjustable control, and the intensity of the light source whereby the intensity of the exposure of the photosensitive material is readily controllable. Also, the size of the light beam imaged onto the photosensitive material is controlled by the addition of a signal source whereupon the areas of full and partial exposure are controlled. Moreover, the system provides for ready adjustment and control of both overlapping and overscanning of the faceplate by the light beam whereby stripes of unexposed photosensitive material are virtually eliminated and the exposure at the ends of the horizontal scan lines is more uniform due to the overscan of the faceplate by the light beam.

While there has been shown and described what is at present considered the preferred embodiments of the invention, it will be obvious to those skilled in the art that various changes and modifications may be made therein without departing from the invention as defined by the appended claims.

What is claimed is:

1. In a control system for use with an optical scanning exposure system in manufacturing cathode ray tubes having a faceplate with a layer of photosensitive material thereon, said optical scanning exposure system including a light source with a wavelength spectrum for exposing the photosensitive material, means for scanning the faceplate with a light beam, and means for deflecting the light beam at an angle related to the angle of incidence of an electron beam in a cathode ray tube, and said electrical control system including an angle of incidence and scan rate memory means, a scan rate means for controlling scanning of the light beam, and an angle of incidence deflection control means for controlling the angle of incidence of the light beam, the improvement comprising means for controlling the integral with respect to time of the light beam intensity at each exposed region of photosensitive material on the faceplate of the cathode ray tube to provide a predetermined amount of exposure at predetermined positional locations across the surface of the faceplate.

2. The improvement of claim 1 wherein said means for controlling the integral with respect to time of the light beam intensity at each exposed region of the photosensitive material on the faceplate of the cathode ray tube includes means for varying the intensity of the light source of the optical scanning exposure system in accordance with the positional location of the light beam on the faceplate.

3. The improvement of claim 1 wherein said means for controlling the integral with respect to time of the light beam intensity at each exposed region of the photosensitive material on the faceplate of the cathode ray tube includes the means for varying the rate of scan of the light beam in accordance with the positional location of the light beam on the faceplate.

4. The improvement of claim 1 wherein said means for controlling the integral with respect to time of the light beam intensity at each exposed region of photosensitive material on the faceplate of the cathode ray tube includes means for providing a light beam angular velocity which is greater at the center than at the ends of each horizontal scan.

5. The improvement of claim 1 wherein said means for controlling the integral with respect to time of the light beam intensity at each exposed region of photosensitive material on the faceplate of the cathode ray tube includes means for providing a decreased intensity of the light source at the center of the faceplate as compared to the intensity of the light source at the ends of the horizontal scan.

6. The improvement of claim 1 wherein said means for controlling the integral with respect to time of the light beam intensity at each exposed region of the photosensitive material on the faceplate of the cathode ray tube includes means for modulating the output of the light source of the optical scanning exposure system in accordance with the positional location of the light beam on the faceplate of the cathode ray tube.

* * * * *